US012778023B2

(12) United States Patent
Fuchs et al.

(10) Patent No.: US 12,778,023 B2
(45) Date of Patent: Nov. 3, 2026

(54) ROUND BALER AND METHOD FOR OPERATING A ROUND BALER

(71) Applicant: Usines CLAAS France SAS, St. Rémy/Woippy (FR)

(72) Inventors: Volker Fuchs, Saarburg (DE); Renaud Wucher, Metz (FR); Romain Dubois, Metz (FR)

(73) Assignee: Usines CLAAS France S.A.S, St. Rémy/Woippy (FR)

( * ) Notice: Subject to any disclaimer, the term of this patent is extended or adjusted under 35 U.S.C. 154(b) by 622 days.

(21) Appl. No.: 18/196,000

(22) Filed: May 11, 2023

(65) Prior Publication Data

US 2023/0363315 A1 Nov. 16, 2023

(30) Foreign Application Priority Data

May 11, 2022 (DE) ..................... 10 2022 111 819.3

(51) Int. Cl.
*A01F 15/07* (2006.01)

(52) U.S. Cl.
CPC ........ *A01F 15/07* (2013.01); *A01F 2015/077* (2013.01); *A01F 2015/0795* (2013.01)

(58) Field of Classification Search
CPC ................ A01F 15/07; A01F 2015/077; A01F 2015/0795
See application file for complete search history.

(56) References Cited

U.S. PATENT DOCUMENTS

| | | | | |
|---|---|---|---|---|
| 4,611,535 A | 9/1986 | Anstey et al. | | |
| 5,622,104 A * | 4/1997 | Viesselmann | A01F 15/07 100/88 | |
| 6,530,311 B1 | 3/2003 | Wilkens et al. | | |
| 7,703,391 B2 | 4/2010 | Duenwald et al. | | |

(Continued)

FOREIGN PATENT DOCUMENTS

| | | | |
|---|---|---|---|
| DE | 4213617 A1 * | 10/1993 | B30B 9/3082 |
| DE | 19718229 A1 | 11/1998 | |

(Continued)

OTHER PUBLICATIONS

English Translation of EP-0875136-A2 (Year: 1998).*

(Continued)

*Primary Examiner* — Claude J Brown
(74) *Attorney, Agent, or Firm* — Lempia Summerfield Katz LLC

(57) ABSTRACT

A method for operating a round baler and a round baler are disclosed. The round baler has a baling chamber having a variable diameter and is bounded by a rotating pressing means. The pressing means is driven and/or guided by rollers, wherein some of the rollers are adjusted by a first and second clamping arms, each of which are pivotably mounted on the housing side. The first and second clamping arms are adjusted by actuators so that a compaction pressure is generated with which the pressing means acts to form a round bale. To regulate the compaction pressure, a pressure relief valve is given an adjustable limit pressure value to transition from a closed position into an open position. The limit pressure value lies above a pressure value which corresponds to a target pressing means tension to achieve the compaction pressure.

17 Claims, 4 Drawing Sheets

(56) References Cited

U.S. PATENT DOCUMENTS

| | | | | |
|---|---|---|---|---|
| 8,616,124 | B2 * | 12/2013 | Humbert | A01F 15/0833 251/129.01 |
| 2009/0217827 | A1 * | 9/2009 | Duenwald | A01F 15/0833 100/88 |
| 2010/0326294 | A1 * | 12/2010 | Smith | A01F 15/0833 100/88 |
| 2013/0298787 | A1 * | 11/2013 | Simmons | A01F 15/18 100/76 |
| 2019/0090430 | A1 | 3/2019 | Arnould et al. | |

FOREIGN PATENT DOCUMENTS

| | | | | |
|---|---|---|---|---|
| DE | 19856977 | A1 | 6/2000 | |
| DE | 102004023698 | B3 * | 12/2005 | A01F 15/0833 |
| EP | 0875136 | A2 * | 11/1998 | A01F 15/0833 |
| EP | 1008292 | B1 | 11/2003 | |
| EP | 1595440 | A1 | 11/2005 | |
| EP | 2243349 | A2 * | 10/2010 | A01F 15/0833 |
| EP | 3031317 | A1 * | 6/2016 | A01F 15/0833 |
| EP | 3036986 | A1 * | 6/2016 | A01F 15/0833 |
| EP | 2878190 | B1 * | 7/2017 | A01F 15/07 |
| EP | 3192349 | A1 * | 7/2017 | A01F 15/0833 |
| EP | 3298881 | A1 | 3/2018 | |
| EP | 3721702 | A1 * | 10/2020 | A01F 15/0833 |
| WO | WO-2015065173 | A1 * | 5/2015 | A01F 15/0715 |

OTHER PUBLICATIONS

English Translation of EP-3036986-A1 (Year: 2016).*
English Translation of DE-4213617-A1 (Year: 1993).*
English Translation of DE-102004023698-B3 (Year: 2005).*
English Translation of EP-2243349-A2 (Year: 2010).*
English Translation of EP-2878190-B1 (Year: 2017).*
European Search Report for European Patent Application No. 23161765.5 dated Oct. 12, 2023.

* cited by examiner

ROUND BALER AND METHOD FOR OPERATING A ROUND BALER

CROSS REFERENCE TO RELATED APPLICATION

This application claims priority under 35 U.S.C. § 119 to German Patent Application No. DE 102022 111 819.3 filed May 11, 2023, the entire disclosure of which is hereby incorporated by reference herein. This application incorporates by reference U.S. application Ser. No. 18/195,997 (now U.S. Pat. No. 12,507,634) entitled "ROUND BALER AND METHOD FOR OPERATING A ROUND BALER" in its entirety.

TECHNICAL FIELD

The present invention relates to a method for operating a round baler and a round baler.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

DE 197 18 229 A1 discloses a method for operating a round baler and a round baler. In the variable round baler disclosed in DE 197 18 229 A1, the compaction pressure for forming or shaping a round bale is applied by a pressing means designed as a pressing belt which is adjusted by means of two clamping arms. For their adjustment, the clamping arms are connected to actuators designed as hydraulic cylinders, which are supplied with a hydraulic fluid corresponding to the compaction pressure to be achieved. For this purpose, a pressure relief valve is installed in the hydraulic system supplying the hydraulic cylinders to control the compaction pressure. The pressure relief valve sets a limit pressure value corresponding to the compaction pressure to be achieved. When the limit pressure value is exceeded, the pressure relief valve is switched to its open position.

BRIEF DESCRIPTION OF THE DRAWINGS

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

Figure 1:
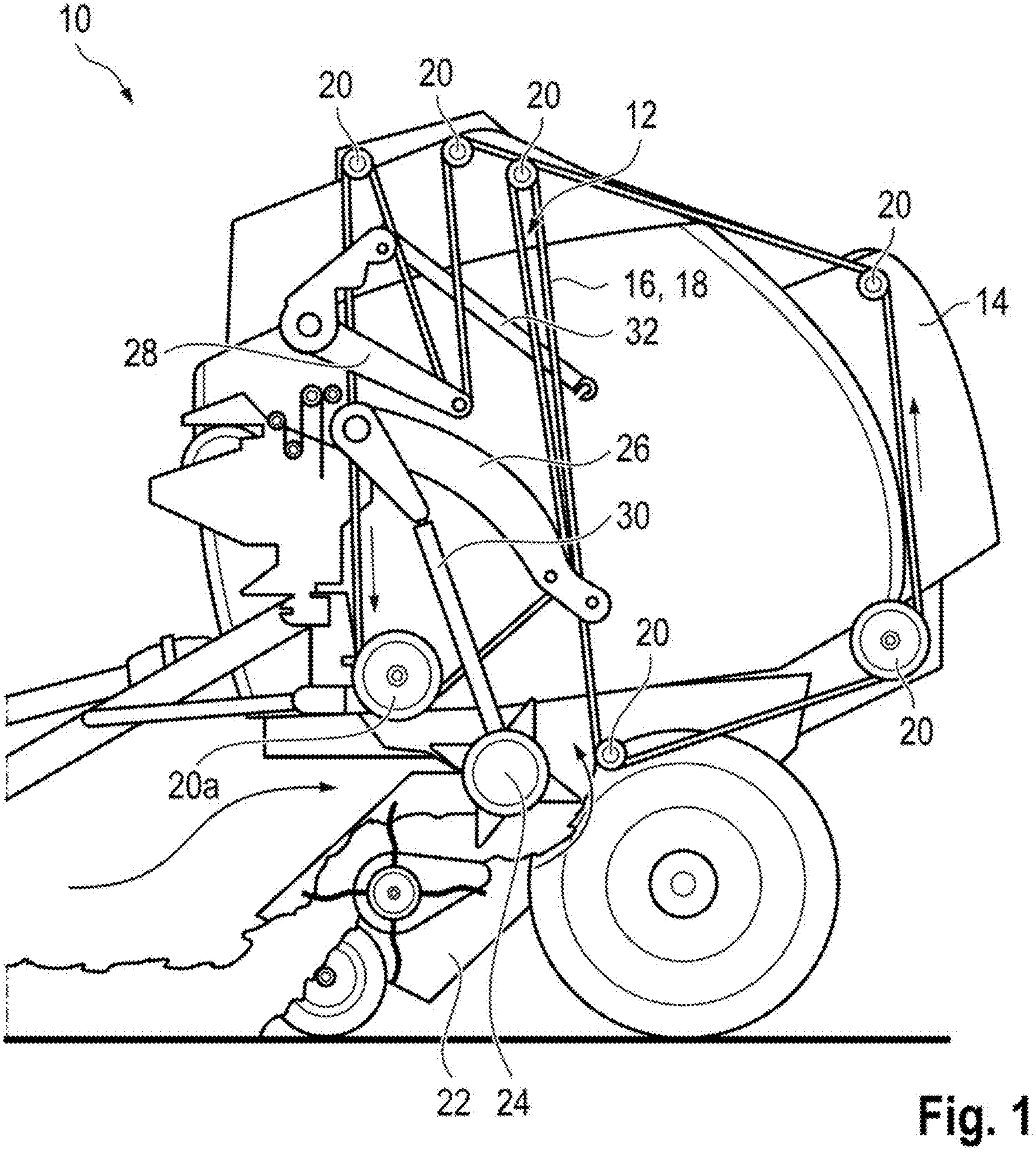
FIG. 1 shows a schematic representation of a round baler with a variable baling chamber.

DE 197 18 229 A1 discloses a round baler. A disadvantage of the baler disclosed in DE 197 18 229 A1 is that the hydraulic system, which changes the load on the actuators of the two clamping arms to adjust the compaction pressure or the belt tension, is a passive device that reacts sensitively to environmental conditions, such as to an uneven supply of harvested material. If there is an uneven harvested material supply, the pressing belt will gradually lose belt tension during operation. This is due to the fact that an uneven harvested material supply induces oscillation in the pressing belt, which results in oscillating belt tension and oscillating hydraulic pressure. Whenever the hydraulic pressure in the system equals the set limit pressure value that causes the pressure relief valve to switch, the pressure relief valve is opened, and the hydraulic pressure in the hydraulic system is reduced. However, this switching behavior may cause the belt tension to decrease during operation and the desired belt tension to successively deviate from the desired or required target belt tension. This situation is unsatisfactory and, in certain circumstances, causes the formed round bales to not have the desired properties in terms of their shape and compaction.

Thus, in one or some embodiments, a round baler and a method for operating the round baler are configured to operate in such a way that more efficient operation of the round baler may be achieved.

In one or some embodiments, a method for operating a round baler is disclosed that has a baling chamber, which may be arranged or positioned in a housing, may have a variable diameter and may be bounded by a continuously circulating pressing means. In one or some embodiments, the pressing means may be driven and/or guided by one or more rollers (such as a plurality of rollers). In one or some embodiments, at least one or some of the rollers may be adjusted in their position by a first clamping arm and a second clamping arm, which may each be pivotably mounted on the housing side. In one or some embodiments, the first clamping arm and the second clamping arm may be adjusted in their position by actuators, such as hydraulically-actuated actuators of a hydraulic system, so that at least one compaction pressure is generated with which the pressing means acts to form a round bale. Further, in one or some embodiments, in order to regulate the compaction pressure, at least one pressure relief valve is given or assigned an adjustable limit pressure value for transferring or transitioning the at least one pressure relief valve from a closed position into an open position by a control unit. In one or some embodiments, the given limit pressure value may be above a pressure value, which may correspond to a target pressing means tension (e.g., target pressing device tension) required to achieve the compaction pressure. In practice, a control unit may actuate (such as periodically actuate) the at least one pressure relief valve, so that the at least one pressure relief valve may be periodically transferred to its open position. The adjustment of the limit pressure value (e.g., adjustment to a value which is above the pressure value that corresponds to the target pressure means tension required to achieve the compaction pressure) may prevent inadvertent opening of the at least one pressure relief valve due to pressure fluctuations which may be caused by the vibrations of the pressing means during the forming process in the hydraulic system. The periodic switching of the at least one pressure relief valve into its open position during the forming process, such as independently of pressure fluctuations, may have the effect that the curve of the actual pressing means tension lies essentially within the range the curve of a nominal pressing means tension. The method may achieve a higher sensitivity with which the hydraulic system of the round baler controlled by the control unit reacts to an uneven supply of harvested material. Another effect is that an operator of the round baler may be relieved of the task of monitoring the pressing means tension. The combination of the adjustment of the limit pressure value and the periodic opening of the at least one pressure relief valve may cause the hydraulic system, which is passive in and of itself, to be actively used. In one or some embodiments, the period and amplitude of the open position may be controlled depending on the deviation of a respective actual pressing means tension from the target pressing means tension as a target value.

In one or some embodiments, value(s) for at least one input variable may be specified by an operator using an input/output unit (e.g., a touchscreen) of the control unit in order to adapt, modify, or change the limit pressure value depending on one or more input variables.

Various input variables are contemplated. As one example, any one, any combination, or all of the following input variables are contemplated: a harvested material type; a bale shape; bale diameters; or absolute or relative values for compaction pressures. The input value(s) for the bale diameter may include a bale start diameter and/or a bale end diameter as minimum and maximum values. Depending on the bale shape, the input may comprise absolute or relative values for the compaction pressures, which may be assigned to the values for the bale start diameter and the bale end diameter. In one or some embodiments, possible bale shapes (which may be presented to the user on the touchscreen for selection) may include a soft core bale or a hard bale. In the case of hard bales, relative values for the compaction pressures may be entered, while in the case of the soft core bale, absolute values for the compaction pressures may be entered.

Furthermore, the input variables may be used to determine the target for the compaction pressure as a function of the current diameter based on a recipe, rules, or an algorithm. In this context, in one or some embodiments, the control unit may automatically convert the input variables for the bale-shape-specific production of the bale (e.g., a soft-core bale or a hard bale) on the basis of stored recipes, sets of rules, or algorithms into a compaction power curve depending on the current diameter. These recipes, rules, or algorithms may then change the target compaction load depending on the current diameter of the bale to be produced.

In one or some embodiments, at least actuation values for the periodic actuation of the at least one pressure relief valve may be determined using at least one stochastic method. Using the control unit, the actuation values may be determined by an estimator. In one or some embodiments, the estimator used may be selected from the group of Bayesian filters, such as a particle filter or a Kalman filter, with the estimation algorithms accordingly implemented therein. The actuating values for the periodic actuation of the at least one pressure relief valve may be any one, any combination, or all of amplitude, pulse duration and period.

In one or some embodiments, the control unit may estimate the actuation values after at least one bale rotation from an expected density of the round bale and a detected throughput during the forming process. In one or some embodiments, the entered input variables may be used to determine the expected density of the round bale at different times during the forming process.

In one or some embodiments, a sensor assembly on the baler may provide or generate sensor signals that are representative or indicative of a distribution of harvested material picked up by a pick-up device of the baler. The control unit may evaluate the sensor signals in order for the control unit to generate control data for controlling actuation of the actuators. In this regard, the control unit may be in communication with the actuators in order to send a command to control the actuators. For this purpose, the sensor assembly may comprise a bale shape sensor assembly that is configured to monitor the bale shape during the bale forming process. Such a bale shape sensor assembly may detect a bale shape that deviates from a substantially circular cylindrical shape, which may be attributable to an uneven harvested material feed.

When the control unit detects an inhomogeneous feed of harvested material into the baling chamber, the control unit may automatically modify the pressing means tension (e.g., increase the pressing means tension). By increasing the pressing means tension, fluttering of the pressing means may be avoided if the round bale to be formed is not completely round. Vibrations in the pressing means as well as in the hydraulic system may be counteracted, which may prevent or at least reduce or minimize a deviation from the target pressing means tension.

In one or some embodiments, working pressures of the actuators of each clamping arm may each be monitored by one pressure relief valve. Compared to the solution known from the prior art, which provides a common pressure relief valve for monitoring the coupling of force of the two clamping arms in the hydraulic system for controlling the compaction pressure, according to this embodiment, at least two pressure relief valves are used, which may make it possible to control the force balance between the two clamping arms for clamping the pressing means using a control algorithm executed by the control unit.

In one or some embodiments, the specified limit pressure value may be increased depending on the increase in the bale diameter. In particular, a development of the limit pressure value may be adapted corresponding to the curve of the target pressing means tension. For example, the control unit may determine an increase in bale diameter, and responsive thereto, the control unit may increase the predetermined limit pressure value depending on the increase in bale diameter.

In one or some embodiments, a round baler is disclosed with a baling chamber arranged or positioned in a housing and having a variable diameter. The baling chamber may be bounded by a pressing means (such as a continuously circulating pressing means), with a plurality of rollers which drive and/or guide the pressing means. To adjust at least some of the rollers in their position, a first clamping arm and a second clamping arm may be pivotably mounted on the housing side. Further, actuators, such as hydraulically-actuated actuators, for adjusting the position of the first clamping arm and the second clamping arm are provided in order to generate a compaction pressure with which the pressing means may act to form a round bale. A control unit may specify to at least one pressure relief valve an adjustable limit pressure value, which may be used to determine when or whether to switch or transition the at least one pressure relief valve from a closed position to an open position in order to regulate the compaction pressure. In one or some embodiments, the specified limit pressure value may be above a pressure value, which may correspond to a target pressure means tension required to achieve the compaction pressure. In addition, the control unit may actuate the at least one pressure relief valve in order to periodically switch the at least one pressure relief valve into its open position during the forming process. Reference may be made to all explanations concerning the method of operating the round baler according to the disclosed method.

In one or some embodiments, the control unit may comprise an input-output unit (e.g., a touchscreen), which may be configured to input one or more input variables by an operator.

In one or some embodiments, the input/output unit may be configured to input as input variables any one, any combination, or all of harvested material type, bale shape, bale diameter, or absolute or relative values for compaction pressures. In one or some embodiments, the input variables of the bale diameter and compaction pressures may be set as range data, such as by using graphically visualized bar charts.

Furthermore, the control unit may be configured to adapt or modify the limit pressure value depending on at least one of the input variables.

In one or some embodiments, the control unit may be configured to determine actuation values for the periodic actuation of the at least one pressure relief valve using at least one stochastic method.

In particular, the round baler may include one or more sensor devices configured to sense one or more aspects of the moisture content of collected harvested material (in order to determine the moisture content of collected harvested material) and/or the feed quantity collected and/or fed to the baling chamber. The moisture content and/or the feed quantity may represent essential operating parameters and/or environmental parameters that may influence the bale forming process. The feed quantity may be determined, for example, by layer height detection in a pick-up device of the baler.

In one or some embodiments, the round baler may have a sensor assembly that is configured to generate or provide sensor signals that are representative or indicative of a distribution of harvested material picked up or collected by a pick-up device of the round baler. The control unit may be configured to receive and evaluate the sensor signals generated by the sensor assembly and, depending on the evaluation of sensor signals, configured to generate control data for actuating the actuators. For this purpose, the sensor assembly may comprise a bale shape sensor assembly that is configured to monitor the bale shape during the bale forming process. Such a bale shape sensor assembly may detect a bale shape that may deviate from a substantially circular cylindrical shape, which may be attributable to an uneven harvested material feed. In this regard, the sensor assembly may generate the sensor signals, which may be indicative of the bale shape. In turn, the control unit may analyze the sensor signals, such as comparing the sensors signals with predetermined sensor signals indicative of one or both of substantially circular cylindrical shape or deviation from the substantially circular cylindrical shape, in order to determine whether the bale shape has or has not deviated from the substantially circular cylindrical shape.

In one or some embodiments, a computer program is provided that comprises program instructions that cause a processor to execute and/or control the steps of the method disclosed herein when the computer program is running on the processor. For example, the algorithm for tensioning the pressing means underlying the computer program may predict the feed quantity of harvested material, and may ensure that only the required quantity of fluid is discharged from the hydraulic system through the at least one pressure relief valve in order to keep (such as always keep) the pressing means under automatic control (e.g., to avoid fluttering of the pressing means due to insufficient pressing means tension).

Referring to the figures, FIG. 1 shows a schematic representation of a round baler with a variable baling chamber (alternatively termed a bale chamber). The round baler 10 (alternatively termed a round bale press) may have a variable baling chamber 12 in a housing 14. For pressing a round bale, the round baler 10 may have a pressing device, such as a continuously circulating pressing means 16. The pressing means 16 may be formed from one or more pressing belts or chains. An example of the pressing means 16 is disclosed in US Patent Application Publication No. 2019/0090430 A1, incorporated by reference herein in its entirety. In one particular example, the pressing means 16 may comprise a press belt that works in combination with a press chamber. The press belt may be guided by one or more guide rollers, which may be circulatingly mounted within an interior space of a housing of the round baler (e.g., the press belt may be designed in the form of an endless belt and placed about the guide rollers in such a manner that the press belt may circulate within the interior of the housing along a running track). The press belt may delimit the press chamber so that material fed to the press chamber may be formed into a round bale within the press chamber. In one or some embodiments, the press chamber is not variable, instead having a fixed cross section. Alternatively, the press chamber may be variable, discussed below (e.g., the press belt may be gradually readjusted with the growing of the round bale, and in this way, may exert a pressing action on the harvest material even in the initial state of the round bale). In practice, A surface of the press belt facing the harvest material to be pressed may be provided with a special surface geometry in order to be able to transmit as large as possible a friction force onto the harvest material so that using the movement of the press belt along the guide rollers, a rotation about the center axis of the round bale may be imposed onto the same.

Thus, in one or some embodiments, the pressing means 16 may be guided by a plurality of rollers 20, wherein the rollers 20 may be stationary or variably arranged. A roller designed as a stationary drive roller may be designated by 20*a*, which may transmit a drive force to the pressing means 16. Harvested material may be picked up (or collected) by a pick-up device 22, which may be in the form of a swath, guided along a rotor 24, whereby the harvested material may be comminuted and introduced into the baling chamber 12, where, in turn, the harvested material may be compacted and pressed into a round bale (not shown). The rotor 24 may thereby project into the baling chamber 12 and be in contact with a round bale, for example rotating in a clockwise direction, and rotate therewith. A finished, pressed round bale is typically wrapped with a wrapping material, such as twine or netting, to stabilize the round bale prior to ejection from the baling chamber 12.

The baling chamber 12 (which may comprise an example of the press chamber), in which the harvested material may be compacted, may be formed by an effective length of the pressing means 16. In one or some embodiments, an effective length of the pressing means 16 is the length of the pressing means 18 which may enclose the baling chamber 12 and, in particular, may act in contact with a round bale and may transmit a pressing force thereto.

In one or some embodiments, the size of the baling chamber 12 may be varied by displacing rollers 20. The displaceable rollers 20 may each be arranged at the end of a first clamping arm 26 and a second clamping arm 28. The first clamping arm 26 may be pivotably mounted on the housing side and may have a plurality of rollers, such as two rollers 20 at its free end, which may guide a loop of the pressing means 16. By changing the position of the first clamping arm 26, the size of the baling chamber 12 may be changed. In one or some embodiments, as the harvested material continues to be fed into the baling chamber 12, the round bale may steadily grow, wherein the first clamping arm 28 may be deflected as the size of the baling chamber 12 increases and, in particular, as the diameter of the round bale increases. As the first clamping arm 26 is increasingly deflected, the size of the baling chamber 12 and the effective length of the pressing means 16 may increase. In order to avoid an excessive increase in the compaction pressure, additional pressing means 16 may be provided via a displacement of the second clamping arm 28, which may span a loop of the pressing means 16. For this purpose, the second clamping arm 28 may be pivoted in such a way that the loop of the pressing means 16 is reduced, and the thereby available length of the pressing means 16 may be used as an effective length. One or more hydraulically-actuated actuators, such as two hydraulically-actuated actuators 30, may be assigned to the first clamping arm 26, and one or more other hydraulically-actuated actuators hydraulically, such as actuated actuator 32, may be assigned to the second clamping arm 28.

The round bale in the baling chamber 12 may grow as the harvested material is increasingly conveyed, which may cause the first clamping arm 26 to be deflected and may increase the effective length of the pressing means 16. The deflection of the first clamping arm 26 may be controlled by at least one pressure relief valve 34, which may allow the compaction pressure to be influenced or affected in addition to any one, any combination, or all of a bale shape, a soft core bale or a hard bale. A force may also be exerted on the free end of the second clamping arm 28 by the pressing means 16, which may cause the second clamping arm 28 to pivot away from the first clamping arm 26 due to the shown arrangement of the rollers 20. Since, when the second clamping arm 28 is pivoted, the loop of pressing means 16 formed there is reduced, the pressing means 16 available for the effective length may increase. By pivoting the second clamping arm 28, the pressing force may also be influenced or affected. In one or some embodiments, the deflection of the second clamping arm 28 may be controlled by another pressure relief valve 36.

Figure 2:
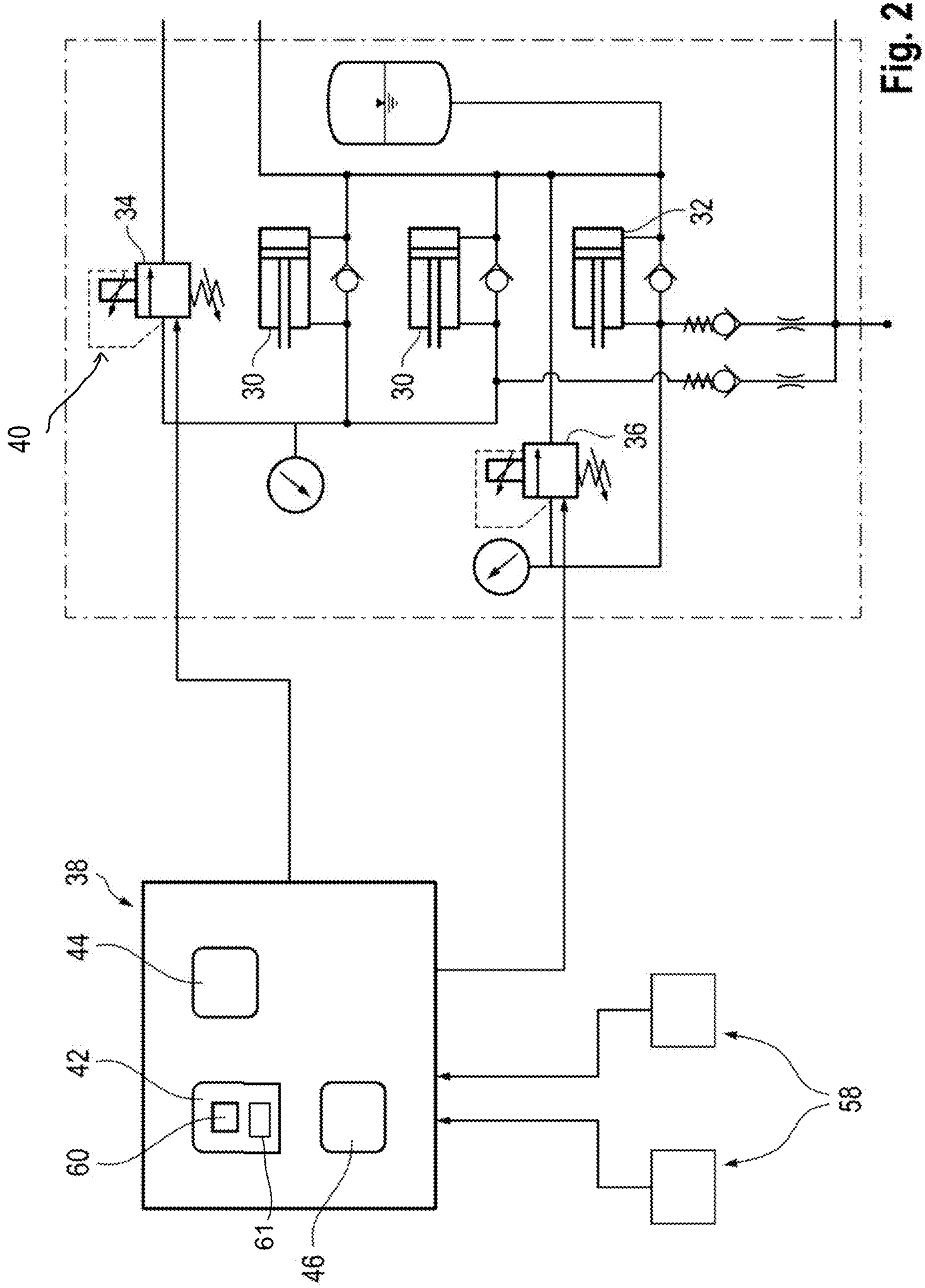
FIG. 2 shows a schematic representation of a control unit of the round baler.

FIG. 2 shows an exemplary illustration of a part of a hydraulic circuit of the round baler 10. The pressing means 16 may apply compaction pressure to form the round bale. In one or some embodiments, the compaction pressure applied by pressing means 18 may be adjusted using one or both of the first and second clamping arms 26, 28. For their adjustment, the first and second clamping arms 26, 28 may be connected to one or more actuators, such as actuators 30, 32, which may be designed as hydraulic cylinders (e.g., may be supplied with a hydraulic fluid corresponding to the compaction pressure to be achieved). The pressure relief valves 34, 36 may be used to set the required or desired pressure values according to the compaction pressure to be achieved. The working pressures of the actuators 30, 32 of each of the first and second clamping arm 26, 28 may be monitored by the respective pressure relief valve 34, 36. The two pressure relief valves 34, 36 may make it possible to control or regulate the balance of forces between the first and second clamping arms 26, 28 using a control algorithm 61. For this purpose, the round baler 10 may have a control unit 38 which is configured to set required limit pressure values for the compaction pressure to be achieved at the pressure relief valves 34, 36 and to run the control algorithm. In principle, the hydraulic system 40 may also comprise only one pressure relief valve 34.

FIG. 2 also shows exemplarily and schematically the control unit 38, which may comprise a memory unit 42, a computing unit 44 and an input-output unit 46. Thus, control unit 38 may comprise one example of computational functionality, which may include the computing unit 44 and the memory unit 42 that stores information and/or software (e.g., control algorithm 61). In one or some embodiments, the computing unit 44 (which may comprise a processor, microprocessor, controller, PLA, or the like) is configured to execute the software stored in the memory. For example, the computing unit 44 may be configured to execute control algorithm 61 to perform the functionality described herein. The memory unit 42 may comprise any type of storage device (e.g., any type of memory). Though the computing unit 44 and the memory unit 42 are depicted as separate elements, they may be part of a single machine, which includes a microprocessor (or other type of controller) and a memory. Alternatively, the computing unit 44 may rely on memory unit 42 for all of its memory needs.

The computing unit 44 and memory unit 42 are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Using the input/output unit 46 (which may comprise a touchscreen), an operator of the round baler 10 may enter one or more input variables, which may be used as a basis for the production of the bale. Various input variables are contemplated. For example, the operator may specify any one, any combination, or all of the following input variables: a type of harvested material; a bale shape; bale diameter; or values for compaction pressures. The values for the compaction pressures may be entered as absolute values or relative values.

Figure 3:
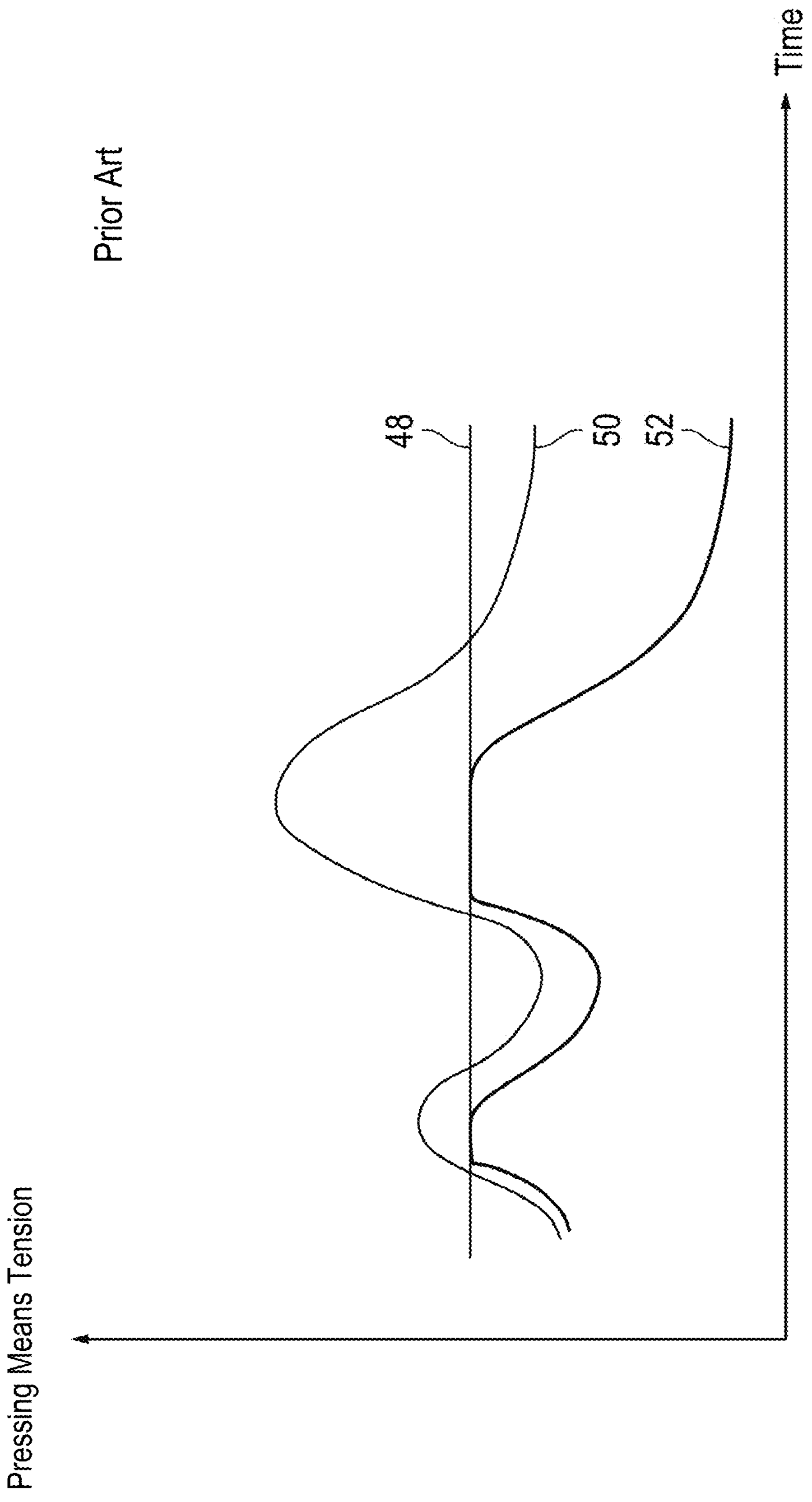
FIG. 3 shows a pressing means tension time diagram according to a prior art control system.

FIG. 3 shows an example of a pressing means tension time diagram according to a prior art control system. FIG. 3 shows sections of a curve of a target pressing means tension 48, a curve of a pressing means tension 50 without intervention by control or regulation, and a curve of a pressing means tension 52 controlled according to the prior the art. The target pressing means tension 48 according to the shown curve corresponds to the desired target compaction pressure during the round bale forming process.

The curve of the unregulated pressing means tension 50 shown as an example in FIG. 3 arises if the vibrations of the pressing means 16 introduced into the hydraulic system 40 due to an uneven harvested material feed are not modified to by a control device (e.g., the unregulated pressing means tension 50 of the pressing means 16 is not temporarily lowered). If there is an uneven harvested material feed, an oscillation is induced in the pressing means 16, which may lead to an oscillating curve of the pressing means tension 50 and therefore correspondingly to an oscillating hydraulic pressure in the hydraulic system 40. Accordingly, the curve of the unregulated pressing means tension 50 has amplitudes that lie below and above the curve for the target pressing means tension 48.

The curve of the pressing means tension 52 controlled according to the prior art is oriented around a set limit pressure value pGrenz, which causes the at least one pressure relief valve 34, 36 to be switched (in this case, both pressure relief valves 34, 36 are switched). The set limit pressure value pGrenz is oriented around the curve of the target pressing means tension 48, whereby the maximum value for the working pressure of the actuators 30, 32 for reaching the target pressing means tension 48 corresponds to the limit pressure value pGrenz. If the actual pressing means tension exceeds the target pressing means tension 48 according to the curve of the pressing means tension 50 shown in FIG. 3, the control system of the prior art detects that the limit pressure value pGrenz has been exceeded, which leads to the temporary opening of the pressure relief valve(s) 34, 36. Therefore, whenever the hydraulic pressure in the hydraulic system 40 corresponds to the set limit pressure value pGrenz (which leads to the switching of a pressure relief valve 34, 36), the pressure relief valve 34, 36 is switched open, and the hydraulic pressure in the hydraulic system 40 is reduced. This results in a smoothing of the tension peaks in the curve of the unregulated pressing means tension 50, but the curve of the controlled pressing means tension 52 decreases in relation to the curve of the target pressing means tension 48 over the course of the forming process as the bale diameter increases.

Figure 4:
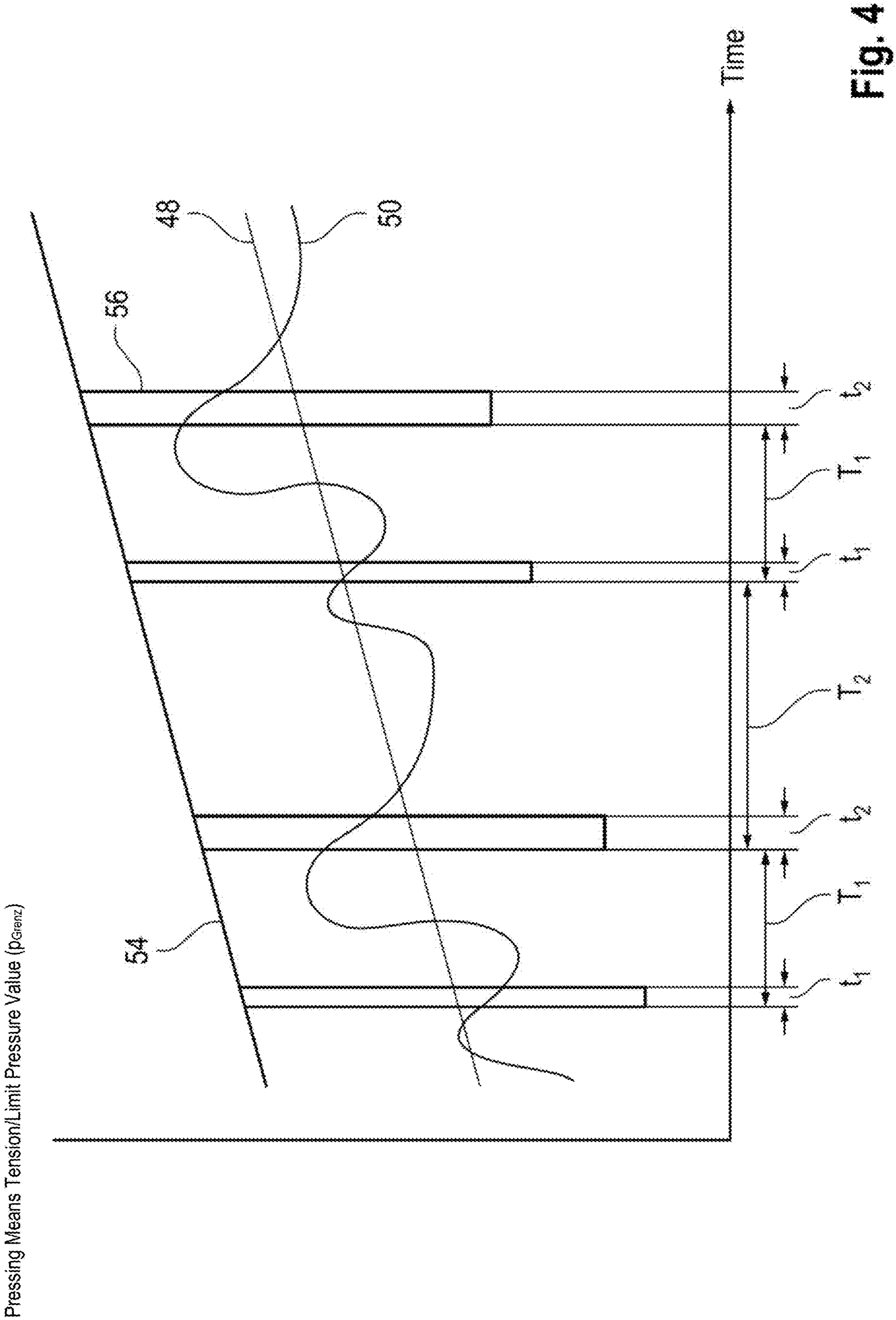
FIG. 4 shows a pressing means tension time diagram according to the method of one embodiment.

FIG. 4 shows an example of a pressing means tension time diagram according to the method according to one embodiment. It again shows the curve of the target pressing means tension 48, and the curve of the unregulated pressing means tension 50, which may occur without control or regulation.

The diagram in FIG. 4 also shows a curve 54 for a limit pressure value pGrenz, which may be set depending on the one or more input variables. The limit pressure value curve 54 may depend, for example, on the compaction pressure to be applied and/or the bale diameter. The specified limit pressure value pGrenz may be above a pressure value which corresponds to a pressing means tension required to achieve the compaction pressure in accordance with the curve of the target pressing means tension 48. This may prevent the pressure relief valves 34, 36 from opening accidentally. At the same time, the at least one pressure relief valve 34, 36 may be switched, such as periodically switched, to its open position during the forming process. Also shown in FIG. 4 is an example of a signal curve 56 for a pulse duration modulation for actuating the at least one pressure relief valve 34, 36 in order to periodically switch it to its open position during the forming process. The control unit 38, controlling the pulse-duration-modulated actuation of the pressure relief valves 34, 36, may cause the curve of the actually occurring pressing means tension to lie essentially within the range of the curve of the target pressing means tension 48. The higher limit pressure value pGrenz may allow pressure peaks to be permitted in the hydraulic system 40 which, according to the prior art (see FIG. 3), are smoothed immediately by opening the at least one pressure relief valve 34, 36. The targeted actuation of the pressure relief valves 34, 36 during the forming process has the effect that the curve of the actual pressing means tension lies essentially in the range of the curve of the target pressing means tension 48. For this purpose, the amplitude, pulse duration t1, t2 and period T1, T2 may be determined and set as actuation values depending on the target pressing means tension 48 and the deviation of the actual curve of the pressing means tension from the curve of the target pressing means tension 48, respectively. The limit pressure value curve 54 may be oriented around the curve of the target pressing means tension 48.

The actuation values of amplitude, pulse duration t1, t2 and period T1, T2 for the periodic actuation of the at least one pressure relief valve 34, 36 may be determined via various methods, such as by using at least one stochastic method. For this purpose, the control unit 38 may estimate the actuation values that occur after at least one bale rotation from an expected density of the round bale and a detected throughput during the forming process. For this purpose, the round baler 10 may include one or more sensor devices for determining the moisture content of picked up harvested material and/or the feed quantity picked up and/or fed to the baling chamber. The moisture content and/or the feed quantity represent essential operating parameters and/or environmental parameters that influence the bale forming process. The feed quantity of picked up harvested material may be determined, for example, by layer height detection in a pick-up device of the round baler 10.

Furthermore, in one or some embodiments, one or more sensor signals provided by sensor assembly 58 (e.g., a multipart sensor assembly) on the round baler 10 may be representative or indicative of a distribution in the transverse direction of harvested material picked up by the pick-up device 22 of the round baler 10. In turn, the control unit 38 may evaluate or analyze the one or more sensor signals from the sensor assembly 58 in order for the control unit 38 to generate control data for actuating the actuators 30, 32. Upon the control unit 38 (responsive to analyzing the one or more sensor signals) detecting an inhomogeneous feed of harvested material into the baling chamber 12, the control device may increase the actual pressing means tension in response thereto.

Using the control unit 38, the actuation values for the pulse-duration-modulated actuation of the pressure relief valves 34, 36 may be determined by an estimator 60. In one or some embodiments, the estimator 60 may be selected from a group of Bayesian filters such as a particle filter or a Kalman filter, with the estimation algorithms accordingly implemented therein. Other estimators are contemplated.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

10 Round bale press
12 Baling chamber
14 Housing
16 Pressing means

18 Pressing belt
20 Roller
20*a* Roller
22 Pick-up device
24 Rotor
26 First clamping arm
28 Second clamping arm
30 Actuator
32 Actuator
34 Pressure relief valve
36 Pressure relief valve
38 Control unit
40 Hydraulic system
42 Memory unit
44 Computing unit
46 Input/output unit
48 Target pressing means tension
50 Pressing means tension
52 Pressing means tension
54 Limit pressure value curve
56 Signal curve
58 Sensor assembly
60 Estimator
61 Control algorithm
t1 Pulse duration/actuation value
t2 Pulse duration/actuation value
T1 Period/actuation value
T2 Period/actuation value

The invention claimed is:

1. A method for operating a round baler, the method comprising:

operating the round baler, the round baler having a baling chamber with a variable diameter and positioned in a housing, the baling chamber being bounded by a rotating pressing device, wherein the pressing device is one or both of driven or guided by rollers, wherein one or more of the rollers are adjusted in their position by a first clamping arm and a second clamping arm which are each pivotably mounted on a side of the housing, wherein one or more hydraulically-actuated actuators of a hydraulic system adjust the first clamping arm and the second clamping arm in their position so that at least one compaction pressure is generated with which the pressing device acts to form a round bale;

regulating the at least one compaction pressure by a control unit assigning at least one pressure relief valve an adjustable limit pressure value for transitioning the at least one pressure relief valve from a closed position into an open position;

wherein the adjustable limit pressure value is above a pressure value which corresponds to a target pressing device tension to achieve the at least one compaction pressure; and wherein the control unit actuates the at least one pressure relief valve to transfer the at least one pressure relief valve to its open position;

wherein the control unit actuates the at least one pressure relief valve to periodically transfer to its open position; and wherein actuation values for periodic actuation of the at least one pressure relief valve are determined using at least one stochastic method.

2. The method of claim 1, further comprising inputting, by an operator via an input/output unit, a value for at least one input variable; and wherein the limit pressure value is selected depending on the value for the at least one input variable.

3. The method of claim 2, wherein the at least one input variable comprises one or more of a harvested material type, a bale shape, bale diameters, or absolute or relative values for compaction pressures.

4. The method of claim 1, wherein the control unit estimates the actuation values that occur after at least one bale rotation from an expected density of the round bale and a detected throughput during a forming process.

5. The method of claim 4, wherein a sensor assembly on the baler provides one or more sensor signals that are representative of a distribution of harvested material picked up by a pick-up device of the baler; and wherein the control unit evaluates the one or more sensor signals in order to generate control data for actuating the one or more actuators.

6. The method of claim 4, wherein, responsive to the control unit detecting an inhomogeneous feed of harvested material into the baling chamber, the control unit increases the pressing device tension.

7. The method of claim 1, wherein working pressures of the one or more actuators of each clamping arm are monitored by the at least one pressure relief valve.

8. The method of claim 1, wherein the control unit determines an increase in bale diameter; and wherein the control unit increases the limit pressure value depending on the increase in bale diameter.

9. A round baler comprising:

a baling chamber that is positioned in a housing, the baling chamber have a variable diameter;

a rotating pressing device configured to bound the baling chamber, the pressing device including one or more rollers configured to perform one or both of drive or guide the pressing device, with a first clamping arm and a second clamping arm pivotably mounted on a side of the housing to adjust at least one or more rollers;

one or more hydraulically-actuated actuators configured to adjust position of the first clamping arm and the second clamping arm in order for the first clamping arm and the second clamping arm to generate a compaction pressure with which the pressing device acts to form a round bale; and a control unit in communication with the one or more hydraulically-actuated actuators and configured to:

specify to at least one pressure relief valve an adjustable limit pressure value for switching the at least one pressure relief valve from a closed position to an open position in order to regulate the compaction pressure, wherein the specified limit pressure value is above a pressure value which corresponds to a target pressure device tension to achieve the compaction pressure; and actuate the at least one pressure relief valve in order to periodically switch the at least one pressure relief valve into its open position during a forming process of the round bale; and wherein the control unit is configured to determine actuation values for periodic actuation of the at least one pressure relief valve using at least one stochastic method.

10. The round baler of claim 9, further comprising an input-output unit configured for an operator to input at least one value for at least one input variable.

11. The round baler of claim 10, wherein the input-output unit is configured to input values for the at least one input variable; and wherein the at least one input variable comprises one or more of harvested material type, bale shape, bale diameter or absolute or relative values for compaction pressures.

12. The round baler of claim 10, wherein the control unit is configured to modify the limit pressure value depending on the values of the at least one input variable.

13. The round baler of claim 9, wherein the control unit is configured to estimate actuation values that occur after at least one bale rotation from an expected density of the round bale and a detected throughput during a forming process.

14. The round baler of claim 13, wherein the control unit is further configured to:

detect an inhomogeneous feed of harvested material into the baling chamber; and responsive to detecting an inhomogeneous feed of harvested material into the baling chamber, increase the pressing device tension.

15. The round baler of claim 9, wherein the at least one pressure relief valve is configured to monitor working pressures of the one or more actuators of each clamping arm.

16. The round baler of claim 9, wherein the control unit is configured to:

determine an increase in bale diameter; and increase the limit pressure value depending on the increase in bale diameter.

17. A round baler comprising:

a baling chamber that is positioned in a housing, the baling chamber have a variable diameter;

a rotating pressing device configured to bound the baling chamber, the pressing device including one or more rollers configured to perform one or both of drive or guide the pressing device, with a first clamping arm and a second clamping arm pivotably mounted on a side of the housing to adjust at least one or more rollers;

one or more hydraulically-actuated actuators configured to adjust position of the first clamping arm and the second clamping arm in order for the first clamping arm and the second clamping arm to generate a compaction pressure with which the pressing device acts to form a round bale;

a sensor assembly positioned on the baler and configured to generate one or more sensor signals that are representative of a distribution of harvested material collected by a pick-up device of the baler; and a control unit in communication with the one or more hydraulically-actuated actuators and configured to:

specify to at least one pressure relief valve an adjustable limit pressure value for switching the at least one pressure relief valve from a closed position to an open position in order to regulate the compaction pressure, wherein the specified limit pressure value is above a pressure value which corresponds to a target pressure device tension to achieve the compaction pressure; and actuate the at least one pressure relief valve in order to periodically switch the at least one pressure relief valve into its open position during a forming process of the round bale;

wherein the control unit is configured to evaluate the one or more sensor signals in order to generating control data for controlling actuation of the one or more actuators.

* * * * *